Nov. 27, 1951 A. W. KAMMERER 2,576,461
REMOVABLE TRAILER HITCH
Filed Aug. 12, 1948
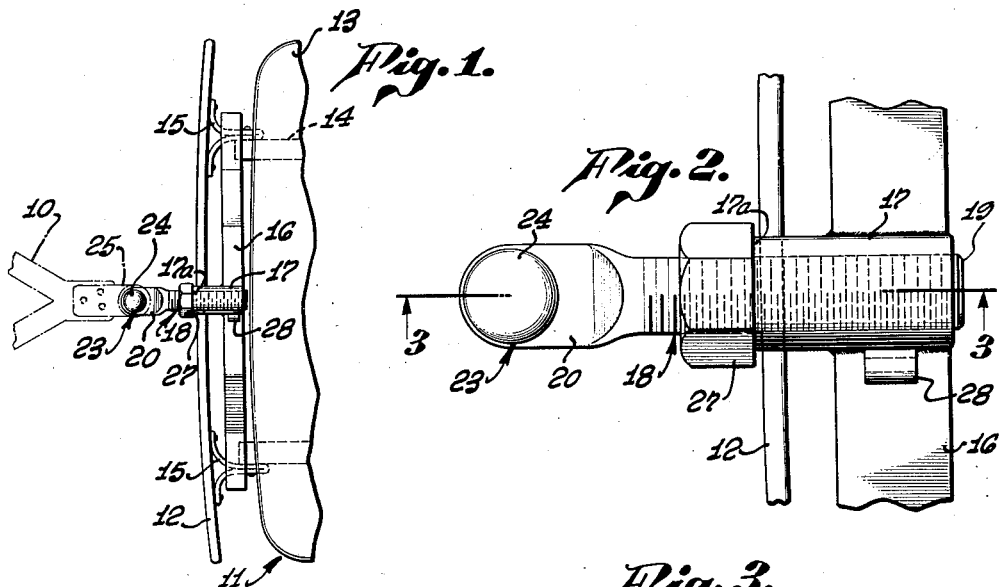
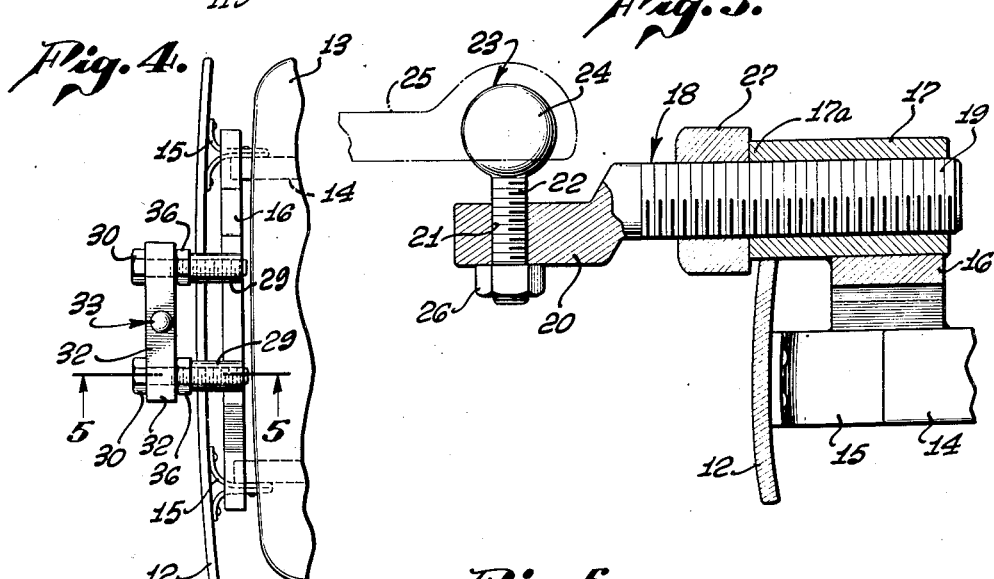
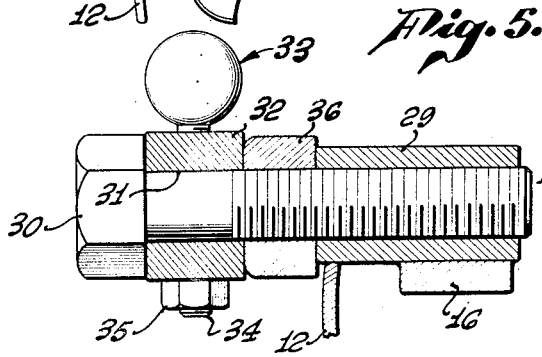
ARCHER W. KAMMERER,
INVENTOR.
BY
Bernard Kriegel
ATTORNEY.

Patented Nov. 27, 1951

2,576,461

UNITED STATES PATENT OFFICE 2,576,461

REMOVABLE TRAILER HITCH

Archer W. Kammerer, Fullerton, Calif.

Application August 12, 1948, Serial No. 43,790

12 Claims. (Cl. 280—33.44)

The present invention relates to trailers, and more particularly to hitches which serve to couple trailers to automobiles or similar vehicles.

Trailer hitches, as heretofore constituted, embody portions that project substantially from the vehicles to which they are secured, when the trailers are not coupled to the vehicles. For example, the hitch may project considerably above or below the rear vehicle bumper. The projecting hitch parts are dangerous, in that they may become hooked inadvertently to other vehicles, as during parking, and may damage such other vehicles, as well as cause injury to persons.

It is, accordingly, an object of the present invention to provide a trailer hitch which does not embody parts projecting substantially or dangerously from the vehicle when the hitch is not in use.

Another object of the invention is to provide a trailer hitch capable of being assembled on or dismantled from a vehicle in a rapid and facile manner.

Still another object of the invention is to provide a trailer hitch capable of use on vehicles having bodies substantially overhanging the rear bumper brackets.

A further object of the invention is to provide a trailer hitch device that can be carried by an automobile or similar vehicle, and in which most of the device can be removed easily from the automobile when not in use.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Figure 1 is a top plan view of one form of the invention applied to the rear of an automobile;

Fig. 2 is an enlarged top plan view of a portion of the trailer hitch device disclosed in Fig. 1;

Fig. 3 is a longitudinal section taken along the line 3—3 on Fig. 2;

Fig. 4 is a view similar to Fig. 1 of a modified form of the invention; and

Fig. 5 is an enlarged longitudinal section taken along the line 5—5 on Fig. 4.

As disclosed in Fig. 1, it is desired to couple the forward end of a trailer frame 10 to the rear of an automobile 11 or similar vehicle. The automobile has the usual rear bumper 12, disposed behind its body 13 and attached to its frame or chassis 14 by the usual bumper brackets 15.

A rigid cross-member or bar 16 is suitably secured, in a known manner, to the upper or lower side of the bumper brackets 15, or automobile chassis 14. As disclosed in the drawings, the cross-member 16 is placed above the bumper brackets for convenience of illustration.

A tubular member 17, in the form of an internally threaded sleeve or nut, is welded to the cross-member 16 substantially centrally of the vehicle, and extends across and beyond the vehicle bumper 12 to a slight extent. As shown most clearly in Fig. 3, the outer end 17a of the threaded sleeve projects but slightly beyond the upper edge of the bumper 12. In view of the convex curvature of the bumper in a vertical plane, the outer end of the sleeve 17a may not actually project beyond the outermost portion of the bumper itself.

A bolt or extension member 18 has an inner threaded shank 19 screwed into the sleeve 17. The extension has an integral outer portion 20 offset downwardly with respect to the axis of the threaded bolt shank. A vertical threaded hole 21 is provided in this portion, into which the lower threaded shank portion 22 of a coupling member 23 may be received. The upper head end of the coupling member is in the form of a sphere or ball 24 over which the usual clamp socket 25 attached to the trailer frame 10 is disposed, in a known manner. The threaded coupling member 23 is prevented from unscrewing from the extension 18 by a lock nut 26 threaded on the shank 22 of the coupling member and jammed against the underside of the offset extension portion 20.

The extension 18 is threaded into the sleeve 17 to the desired extent, and with the offset portion 20 disposed in a downward direction to locate the threaded hole 21 vertically. Thereafter, a jam or lock nut 27, which has previously been threaded upon the shank 19 of the extension, is tightened against the outer end 17a of the sleeve, such tightening being permitted because of the slight overhanging of the sleeve beyond the bumper. The jam nut 27 holds the cooperating threads on the extension shank 19 and sleeve 17 in snug engagement with each other and prevents loosening or rattling of the parts, that would otherwise be conducive to wear.

The offset portion 20 allows the center of the ball 24 to be placed closer to the axis of the extension shank 19, and thereby reduces the moment arm between the ball center and the shank axis that might tend to allow lateral movement of the trailer frame to rotate the extension 18 in the sleeve 17. The offset portion 20 not only minimizes the above rotary tendencies, but it also provides ample space for the clamp socket 25 on the trailer to be properly disposed about the ball 24.

A ring 28 may be welded, or otherwise suitably secured, to one side of the threaded sleeve 17, in order to provide an anchor for the usual safety chain (not shown) running between the automobile 11 and the trailer 10. This chain connecting element 28 does not interfere with the operation of the trailer hitch in any particular.

When the hitch is not in use, substantially all of it can be removed from the vehicle. Thus, the jam nut 27 may be loosened and the threaded extension 18 unscrewed from the sleeve 17. The latter, together with the cross bar 16, may remain attached to the vehicle at all times. Since the sleeve 17 projects vertically above the bumper to only a slight extent, and has a smooth, cylindrical exterior, it will not readily snag or catch on other objects, such as the front bumper of another vehicle disposed to the rear. The sleeve 17 projects only slightly beyond the bumper 12 and creates an absence of any member projecting substantially beyond the bumper, which may cause damage to the property of others.

When the trailer is to be used, it is a simple matter to thread the extension 18 into the sleeve 17, with the coupling member 23 disposed vertically, and to tighten the nut 27 against the outer end 17a of the sleeve.

Certain types of vehicles, such as station wagons, have their body members projecting substantially over the bumper brackets. This arrangement precludes the use of prior trailer hitches, in which the ball coupling member is mounted directly upon the cross-member 16. The device described above can be used on station wagons and the like, since the threaded sleeve or collar 17, although extending between the body and the bumper, allows the ball connecting member 23 to be disposed substantially beyond the rear bumper 12, or away from the vehicle body. The clamp socket 25 on the trailer frame 10 can then be coupled readily to the ball connector member without interference from the vehicle body.

In the form of the invention disclosed in Figs. 4 and 5, a stronger construction is provided by welding two internally threaded sleeves 29 to the cross-member or bar 16 on opposite sides of the vehicle center line. These sleeves have bolts 30 threaded into them, the bolts extending through holes 31 in a cross-member 32, in which the hitch connecting member 33 is mounted. Thus, the threaded shank 34 of the connecting member 33 is screwed through the cross-member 32, and a lock nut 35 disposed on its lower end in tight bearing relation against the underside of the cross-member 23. The bolt extensions 30 are prevented from unscrewing from the threaded sleeves 29 by jam or lock nuts 36 threaded on the bolts and bearing against the sleeves.

When the trailer hitch is not to be used, the jam nuts 36 are loosened and the two bolts 30 are unscrewed from the threaded sleeves 29. These latter members project only slightly beyond the bumper 12 and will not damage adjacent vehicles or other objects during use of the vehicle to which they are secured.

The spaced sleeve and bolt arrangement 29, 30 provides a two-point support for the trailer hitch and forms a sturdy and strong construction. The bolts 30 and the intervening jam nuts 36 may be made of any desired length, so as to dispose the trailer coupling member 33 further from or closer to the vehicle, if desired.

The inventor claims:

1. In a trailer hitch: a cross-member adapted to be secured to a vehicle having a rear bumper; a threaded member attached to said cross-member and extending to a point adjacent said bumper; an extension threadedly attached to said threaded member and having a portion offset in a downward direction with respect to the axis of said member; and a trailer coupling element secured to said offset portion and extending substantially perpendicular thereto.

2. In a trailer hitch: a cross-member adapted to be secured to a vehicle having a rear bumper; an internally threaded sleeve attached to said cross-member; an extension threaded into said sleeve and having a portion offset in a downward direction with respect to the axis of said sleeve; and a trailer coupling element secured to said offset portion and extending substantially perpendicular thereto.

3. In a trailer hitch: a cross-member adapted to be secured to a vehicle having a rear bumper; an internally threaded sleeve attached to said cross-member; an extension threaded into said sleeve and having a portion offset in a downward direction with respect to the axis of said sleeve; and a trailer coupling element having a shank portion extending into said offset portion and also having a generally spherical head adapted to receive a companion coupling element on a trailer.

4. In a trailer hitch: a cross-piece adapted to be secured to a vehicle; a plurality of spaced internally threaded sleeves secured to said cross-piece; extension elements threaded into said sleeves; a cross-member mounted on said extensions; and a coupling element secured to said cross-member.

5. In a trailer hitch: a cross-member adapted to be secured to a vehicle having a rear bumper; a threaded member rigidly attached to said cross-member; an extension member threaded onto said threaded member; a lock nut threaded on one of said members and engaging the other of said members; and a trailer coupling element secured to said extension member.

6. In a trailer hitch: a cross-member adapted to be secured to a vehicle having a rear bumper; a threaded member attached to said cross-member; an extension threadedly attached to said threaded member and having a portion offset with respect to the axis of said member; and a trailer coupling element secured to said offset portion.

7. In a trailer hitch: a cross-member adapted to be secured to the rear portion of a vehicle; an internally threaded sleeve attached to said cross-member; an extension threaded into said sleeve and having a portion offset with respect to the axis of said sleeve; and a trailer coupling element secured to said offset portion and extending substantially perpendicular thereto.

8. In a trailer hitch: a cross-member adapted to be secured to the rear portion of a vehicle; an internally threaded sleeve attached to said cross-member; an extension threaded into said sleeve and having a portion offset with respect to the axis of said sleeve; and a trailer coupling element having a shank portion extending into said offset portion and also having a generally spherical head adapted to receive a companion coupling element on a trailer.

9. In a trailer hitch: a cross-piece adapted to be secured to a vehicle; a plurality of spaced members rigidly secured to said cross-piece and extending transversely of said cross-piece; an extension for each member mounted coaxially of and detachably and rigidly secured directly to each member, each extension extending axially outwardly beyond the member to which it is secured; a cross-member rearwardly of said members mounted on and extending between said extensions; and a trailer coupling element secured to said cross-member.

10. In a trailer hitch: a cross-piece adapted to be secured to a vehicle; a plurality of spaced members rigidly attached to said cross-piece with their axes disposed transversely of said cross-piece; an extension coaxial of each member and detachably and rigidly secured directly to each member by axial movement along said member, each extension extending axially outwardly beyond the member to which it is secured; a cross-member rearwardly of said members mounted on and extended between said extensions; and a trailer coupling element secured to said cross-member.

11. In a trailer hitch: a cross-piece adapted to be secured to a vehicle; a plurality of spaced members rigidly secured to said cross-piece, each member having its axis disposed transversely of said cross-piece; an extension mounted on and detachably and rigidly secured to each of said members and having its axis coaxial of the axis of the member to which it is secured; and means including a trailer coupling element carried by said extensions rearwardly of said spaced members.

12. In a trailer hitch: a cross-piece adapted to be secured to a vehicle; a plurality of threaded members spaced along and secured to said cross-piece; extension elements threaded on the threaded portions of said members; a cross-member mounted on said extension elements; and a coupling element secured to said cross-member.

ARCHER W. KAMMERER.

REFERENCES CITED

The following references are of record in the file of this patent:

UNITED STATES PATENTS

| Number | Name | Date |
|---|---|---|
| 762,480 | Keene | June 14, 1904 |
| 1,779,192 | Signer | Oct. 21, 1930 |
| 1,816,121 | Lamarrah | July 28, 1931 |
| 2,097,006 | Weis | Oct. 26, 1937 |
| 2,320,046 | Notar | May 25, 1943 |
| 2,360,643 | Bixel | Oct. 17, 1944 |
| 2,408,531 | Riemann et al. | Oct. 1, 1946 |